United States Patent [19]

Golinelli

[11] 4,409,737

[45] Oct. 18, 1983

[54] GAUGING HEAD FOR CHECKING LINEAR DIMENSIONS OF MECHANICAL PIECES

[75] Inventor: Guido Golinelli, Bologna, Italy

[73] Assignee: Finike Italiana Marposs S.p.A., S. Marino di Bentivoglio (BO), Italy

[21] Appl. No.: 283,887

[22] Filed: Jul. 16, 1981

[30] Foreign Application Priority Data

Jul. 25, 1980 [IT] Italy ................... 3485 A/80

[51] Int. Cl.³ .............................. G01B 7/28
[52] U.S. Cl. .................. 33/172 E; 33/149 J; 33/169 R; 33/174 Q
[58] Field of Search .............. 33/172 E, 148 H, 149 J, 33/169 R, 174 Q, 174 P, 178 E

[56] References Cited

U.S. PATENT DOCUMENTS

| 3,946,492 | 3/1976 | DuBose, Jr. ................. 33/169 R |
| 4,228,591 | 10/1980 | Sterki et al. ................. 33/174 L |
| 4,348,814 | 9/1982 | Possati et al. ................. 33/147 K |

FOREIGN PATENT DOCUMENTS

| 628400 | 8/1949 | United Kingdom ............ 33/147 D |
| 1544975 | 4/1979 | United Kingdom ............ 33/174 L |
| 2056679 | 3/1981 | United Kingdom ............ 33/148 H |
| 2064777 | 6/1981 | United Kingdom ............ 33/174 L |

Primary Examiner—Willis Little
Attorney, Agent, or Firm—Stevens, Davis, Miller & Mosher

[57] ABSTRACT

A gauging head for checking linear dimensions of mechanical pieces comprising a single member including a movable arm, a support for the movable arm, and a fulcrum for pivoting movements of the arm with respect to the support. The member also defines seats for an inductive transducer coupled to the arm and the support, the transducer being sealed by a resilient gasket.

14 Claims, 5 Drawing Figures

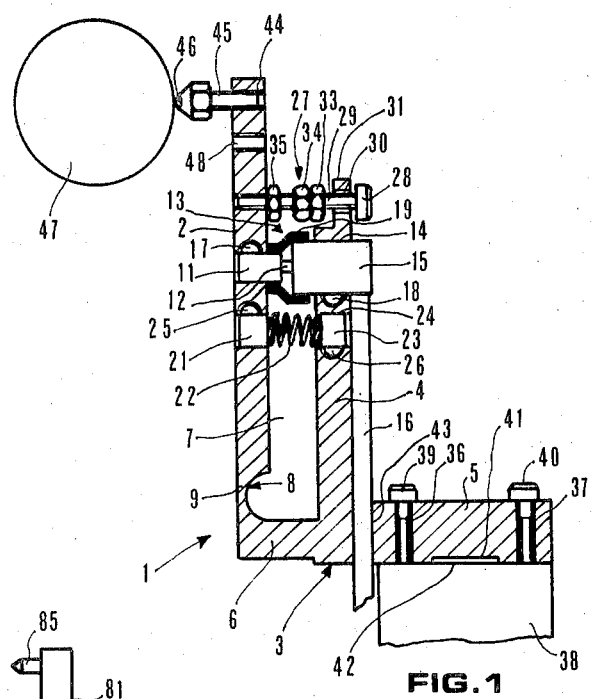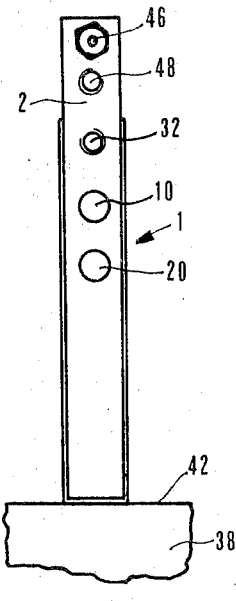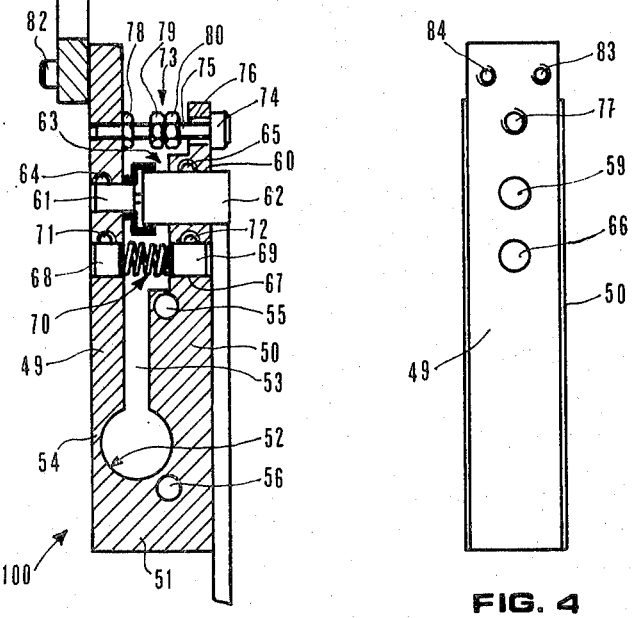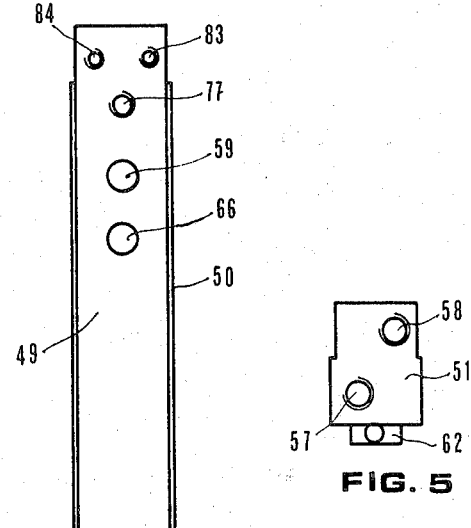

GAUGING HEAD FOR CHECKING LINEAR DIMENSIONS OF MECHANICAL PIECES

The present invention relates to a gauging head for checking linear dimensions of mechanical pieces, with a measuring arm, a feeler fixed to the arm for contacting the piece to be checked, supporting means for supporting the arm and for locking the head to an external support, fulcrum means for coupling the arm to the supporting means while permitting pivotal movements of the arm about a geometrical axis substantially perpendicular to the arm, a transducer with two mutually movable elements fixed to the arm and the supporting means, respectively, the transducer providing a signal representative of the position of the arm with respect to the supporting means.

Conventional gauges for checking geometrical features of mechanical pieces comprise an outer shell and a movable arm having a first section located within the shell and a second section located outside the shell. The second section includes a feeler for contacting the piece to be checked.

A fulcrum permitting pivotal movements of the arm and defined, for example, by thin flexible laminae or by a pivot and a precision bushing, is coupled to the arm and to a supporting member fixed to the shell and located inside the same shell.

The displacements or, more exactly, the positions of the arm are detected by a transducer including elements fixed to the first arm section and to the supporting member respectively. The transducer is connected, through connecting means, to an external supply and indicating group.

The shell is provided for mechanically protecting the gauge elements located inside the same shell and for permitting locking of the gauge to an external support.

These conventional gauges usually comprise sealing gaskets, arranged between the shell and the arm and between the shell and the transducer connecting means, for preventing foreign material, such as moisture and dust, from entering the gauge with the possibility of detrimentally affecting its operation due, for example, to damage in the transducer.

These conventional gauges present some drawbacks, for example they are considerably expensive because they are constituted by several distinct elements, such as the arm, the elements defining the fulcrum, the supporting member, the sealing gaskets and means for coupling the preceding distinct elements.

A further drawback derives from the play arising between the various coupled elements which may cause measurement errors.

Another drawback is due to the considerable overall dimensions, mainly caused by the shell.

The object of the present invention is to provide a gauging head which is sturdy, cheap, accurate, has small overall dimensions and is not substantially affected by play occurring among the different functional parts.

This object is achieved by a gauging head of the kind set forth in which, according to the invention, the arm, the supporting means and the fulcrum means are defined, substantially, as a sole member having a first section, a second section, and a third section, the first section defining the arm, the second section being part of the supporting means and being adjacent to the first section, and the third section coupling the first section to the second section and defining fulcrum means consisting substantially of a lightened and resiliently flexible section, this flexible section permitting the movement of the arm with respect to the second section.

Other details and features of the invention will stand out from the description given below by way of non-limitative example and with reference to the accompanying drawings, in which:

FIG. 1 is a partly in section front elevational view of a gauging head according to a preferred embodiment;

FIG. 2 is a side view of the gauging head of FIG. 1;

FIG. 3 is a partly in section front elevation view of a gauging head according to a second embodiment;

FIG. 4 is a simplified side view of the gauging head of FIG. 3; and

FIG. 5 is a bottom plan view of the gauging head of FIG. 4.

Referring first to FIGS. 1 and 2, there is shown a gauging head including a member 1 obtained by a sole shaped piece. Member 1 comprises a first substantially prismatic section, or arm 2, extending mainly along a longitudinal direction and having a cross-section with a rectangular perimeter. Moreover member 1 comprises a second section including an arm support 3 with a substantially prismatic portion 4—the support extending along said longitudinal direction and being adjacent to arm 2—and a portion or wing 5, which is prependicular to the longitudinal direction and also has a substantially prismatic shape.

A connecting section 6 connects arm 2 to support 3. Arm 2, portion 4 and connecting section 6 are obtained by making a longitudinal cut in the sole piece from which member 1 is obtained.

Connecting section 6 presents a slot 8 defining a geometrical axis perpendicular to the longitudinal direction of arm 2. Slot 8 defines a section 9 integrally connected to the lower end of arm 2 which section has a smaller thickness than that of arm 2 and that of the remaining part of connecting section 6. The cross-section of section 9 having the minimum thickness substantially identifies a fulcrum about which arm 2 may pivot with respect to support 3.

A bore 10 obtained in arm 2 houses a solid cylinder 11 coupled to a stem 12 carrying at an end a movable magnetic core, not visible, of a differential transformer position transducer 13, which provides a signal representative of the position of arm 2 with respect to support 3. Portion 4 of support 3 defines a hole 14, which is substantially aligned with hole 10 and which houses a cylindrical shell 15 containing the windings of transducer 13.

The magnetic core is movable, substantially axially, within cylindrical shell 15. The transducer windings are electrically connected to a supply, processing and indicating group, not shown, through a cable 16 coming out through a side of shell 15.

Cylinder 11 and shell 15 are locked to arm 2 and portion 4, respectively, through lock screws, not shown, screwed into threaded bores 17, 18 perpendicular to and communicating with holes 10 and 14.

Shell 15 has a base adjacent to cable 16 and an opening for the passage of cable 16, which are sealed, for example by an epoxy resin. A resilient gasket 19, made of rubber, has an end fixed to cylinder 11 and the other end fixed to shell 15 in such a way that transducer 13 is sealed.

Arm 2 defines a hole 20 housing a small cylinder 21 having a base acting as an axial abutment for an end of a helical spring 22. The other end of spring 22 bears against a base of a small cylinder 23 housed within a hole 24 of portion 4, this hole being substantially aligned with hole 20. Cylinders 21, 23 define cylindrical projections, not visible, for axially positioning and supporting spring 22. Lock screws, not shown, are inserted into threaded bores 25, 26 perpendicular to and communicating with holes 20, 24 and lock cylinders 21, 23 to arm 2 and portion 4, respectively.

The pivotal displacements of arm 2 with respect to portion 4 are limited, both in clockwise and counterclockwise direction, by a limiting device 27 which includes a screw 28 having a threaded shank 29 passing—with considerable radial play—through a hole 30 obtained at an end 31 of portion 4; three nuts 33, 34, 35 screwed onto shank 29 and shank 29 being threadedly coupled with a hole 32 of arm 2. Nut 35 is tightened against arm 2 for preventing accidental loosening of screw 28. Nut 33 has a base, adjacent to end 31, which can abut against this end 31 for limiting the clockwise displacements of arm 2. Nut 34 is tightened against nut 33 for axially locking nut 33 on shank 29. The counterclockwise displacement of arm 2 in FIG. 1 is limited due to the contact of the head of screw 28 with end 31.

Portion 5 defines two through holes 36, 37 which permit clamping the gauging head to an external support 38, by screws 39, 40. Portion 5 also defines a slot 41, for reducing its contact surface with a face 42 of external support 38, and a hole 43 for the passage of cable 16. Arm 2 defines, at its upper free end, a threaded bore 44 for coupling with a threaded stem 45 of a feeler element 46 adapted to contact the surface of the piece 47 to be checked.

After unscrewing feeler element 46, it is possible to couple to arm 2 an extension, not shown, having a relevant feeler element. The extension can be coupled to arm 2 by screws which are secured to threaded bore 44 and to another threaded bore adjacent to the latter.

The use of extensions, possibly of different shapes, may be necessary if piece 47 has a complicated form or presents parts difficultly accessible.

The thickness of support 3 along the direction perpendicular to the plane of FIG. 1 is greater than that of arm 2, therefore it is possible to mount on external support 38 a plurality of gauging heads with the relevant supports 3 in side by side contact, without any interference between the arms 2 of the heads.

The operation of the gauging head is as follows.

Spring 22 is a compression spring and therefore urges arm 2 in FIG. 1 to rotate in a counter-clockwise direction about the fulcrum defined by section 9, up to maximum opening condition determined by the contact of the head of screw 28 with end 31 of portion 4.

By loosening nut 35 and loosening screw 28, it is possible to adjust to the maximum amount of the counter-clockwise displacement of arm 2. By loosening nut 34 and adjusting nut 33 it is also possible to adjust to the maximum amount the clockwise displacement of arm 2.

The thrust of spring 22 may be adjusted by loosening the lock screws coupled to threaded bores 25, 26 and changing the axial distance of cylinders 21, 23 which provide abutments for the ends of spring 22.

The mutual position of the core and the windings of transducer 13 may be adjusted by loosening the screws screwed into bores 17, 18 and axially displacing cylinder 11 and shell 15 along bore 10 and hole 14, respectively. Thus, it is possible to zero-set the gauging head by a master piece, through adjustment of the position of the transducer core with respect to the windings, in such a way as to obtain a signal close to zero, and through subsequent adjustment of potentiometers provided in the supply, processing and indicating group, obtain an indication of zero measurement.

The contact of feeler element 46 with the surface of piece 47 causes a clockwise rotation of arm 2, from the position of maximum opening. This rotation produces a change in the mutual position of the movable core and the transducer windings, which—as above mentioned—are coupled to arm 2 and portion 4, respectively. Transducer 13 transforms the change in the mutual position of the movable core and the windings into an electric signal which is representative of the deviation of the dimension of piece 47 from that of the master piece previously used for zero-setting the gauging head.

The gauging head shown in FIGS. 3, 4 and 5, which is a variant with respect to the embodiment of FIGS. 1, 2, comprises a member 100 constituted by a sole shaped body, with an arm 49 extending mainly along a longitudinal direction, a support 50 adjacent to arm 49 and a connecting section 51 which connects arm 49 to support 50.

Arm 49 and support 50 have substantially prismatic shapes, with cross-sections—perpendicular to the longitudinal direction of arm 49—having rectangular perimeters.

Member 100 defines a cylindrical hole 52 having an axis perpendicular to the longitudinal direction of arm 49 and a longitudinal cut 53—communicating with hole 52—which separates arm 49 from support 50. The surface of hole 52 defines a zone 54 having a smaller thickness than those of arm 49 and connecting section 51 with arm 49, and the cross-section of this zone which has the minimum thickness defines a fulcrum for the pivotal displacement of arm 49 with respect to support 50.

Support 50 defines a through hole 55, which together with a through hole 56 of connecting section 51 serves for locking the gauging head to an external support, not shown, in a first position. Through holes 55, 56 have geometrical axes perpendicular to the longitudinal direction of arm 49.

As shown in FIG. 5, connecting section 51 also defines two threaded dead holes 57, 58 which define geometrical axes substantially parallel to the longitudinal direction of arm 49 and serve for locking the gauging head to an external support, not shown, in a second position substantially perpendicular to the first position.

Arm 49 and support 50 define two holes 59, 60, substantially aligned, wherein there are housed, with the possibility of axial adjustments, two parts 61, 62 of a sealed differential transformer transducer 63. Parts 61, 62 are locked to arm 49 and support 50, respectively, by lock screws, not shown, inserted into threaded bores 64, 65 communicating with holes 59, 60. Transducer 63 is substantially similar to transducer 13 of FIG. 1 and is sealed in the same way.

Arm 49 and support 50 define substantially aligned holes 66, 67, wherein there are housed, with the possibility of axial adjustments, small cylinders 68, 69 having facing bases which provide adjustable axial abutments for a spring 70. Cylinders 68, 69 are locked to arm 49 and support 50, respectively, by lock screws, not shown, inserted into holes 71, 72 communicating with holes 66, 67. A device 73 for limiting the rotational displacements of arm 49 about the fulcrum defined by zone 54 includes a screw 74 having a threaded shank 75 passing, with radial play, through a hole 76 of support 50. Shank 75 is screwed into a threaded bore 77 of arm 49 and is coupled with three nuts 78, 79, 80.

Device 73 is similar to device 27 and therefore its operation shall not detailedly be described.

An extension 81 is fixed to the free end of arm 49 through screws, only one of which, 82, is visible in FIG. 3. These screws are screwed into threaded bores 83, 84 of arm 49. Extension 81 carries a feeler 85 for contacting the piece to be checked, not shown.

The operation of the gauging head of FIGS. 3-5 is similar to that of the gauging head of FIGS. 1 and 2 and therefore shall not be described.

The above described gauging heads can undergo further variants, for example it is possible to provide dovetail guides, or an equivalent type, in portion 5 or in support 50 for locking the gauging heads to an external support.

It is also possible to lock cylindrical shell 15 of transducer 13 to portion 4 or part 62 of transducer 63 to support 50 in a way not adjustable, by using, for example, an epoxy resin. In this case the mutual axial position of cylinder 11 and shell 15, or that of parts 61, 62 can be adjusted by acting on cylinder 11 or on part 61 only.

The described and illustrated gauging heads may be obviously subjected to further changes and variants equivalent from a functional and structural point of view without departing from the scope of the invention.

What is claimed is:

1. A gauging head for checking linear dimensions of mechanical pieces comprising:
    an integral member including: a first section defining a measurement arm, a second section defining arm supporting means and a third section connecting the first section and the second section, the third section defining fulcrum means consisting substantially of a portion of reduced thickness permitting pivotal movements of the first section with respect to the second section, about a geometrical axis substantially perpendicular to the arm, the arm extending substantially along a longitudinal direction and having an end integrally connected with said portion and a free end;
    a feeler fixed at the free end of the measurement arm, for contacting the piece to be checked;
    a transducer including: two mutually movable elements fixed to the measurement arm and the second section, respectively, and sealing means coupled to said mutually movable elements, at least one of the two mutually movable elements being adjustably fixed to the measurement arm or the second section, respectively, the transducer being adapted to provide a signal representative of the position of the measurement arm with respect to the second section, the second section being adjacent to the first section;
    an adjustable limiting device fixed to at least one of said first and second sections and adapted to cooperate with the other of said first and second sections for limiting the pivotal movements of the first section;
    spring means including a spring having two ends coupled to the measurement arm and the second section, respectively, for urging the arm to pivot about the fulcrum means, the spring means including adjustment means for adjusting the thrust of the spring; and
    locking means for directly locking at least one of said second and third sections to an external support, the second and third sections defining a plurality of holes for permitting locking of the gauging head in different positions with respect to the external support.

2. A gauging head for checking linear dimensions of mechanical pieces, comprising a measuring arm, a feeler fixed to the arm for contacting the piece to be checked, supporting means for supporting the arm and for locking the head to an external support, fulcrum means for coupling the arm to the supporting means while permitting pivotal movements of the arm about a geometrical axis substantially perpendicular to the arm, a transducer with two mutually movable elements fixed to the arm and the supporting means, respectively, the transducer providing a signal representative of the position of the arm with respect to the supporting means, wherein the arm, the supporting means and the fulcrum means are defined, substantially, by a sole member including a first section, a second section, and a third section, the first section defining the arm, the second section being part of the supporting means and being adjacent to the first section, and the third section coupling the first section to the second section and defining fulcrum means consisting substantially of a portion of reduced thickness, this portion permitting the movement of the arm with respect to the second section, the gauging head further including a limiting device for limiting the pivotal movements of said arm, the limiting device comprising an element coupled to the arm and passing through a hole of the second section, and adjustable reference means coupled to said element of the limiting device intermediate the first and second sections for cooperating with one surface of the second section, said element defining a surface cooperating with a second surface of said second section.

3. The gauging head according to claim 2, wherein said sealing means comprises a sealing gasket coupled to said two elements.

4. The gauging head according to claim 3, wherein the arm and the second section define substantially aligned holes for housing, with possibility of axial adjustments, the two mutually movable elements of the transducer and further holes communicating with said substantially aligned holes for housing locking screws for locking the two movable elements to the arm and the second section, respectively.

5. The gauging head according to claim 4, further including a coil spring defining a geometrical axis, the spring cooperating with the arm and the supporting means, and supporting and abutment elements for supporting and providing axial abutments to the spring and wherein the arm and the second section of the supporting means define substantially aligned openings for housing said supporting and abutment elements, with possibility of axial adjustments, and holes communicating with the supporting and abutment elements, for housing locking screws for locking the supporting and abutment elements to the arm and the second section, respectively.

6. The gauging head according to claim 2, wherein said element of the limiting device is a screw having a head and a threaded shank, said arm defining a hole for threadedly engaging said shank; the reference means including a first nut coupled to the shank.

7. The gauging head according to claim 6, wherein the limiting device comprises a second nut for locking the screw of the limiting device to the arm and a third nut for axially locking the first nut to the shank.

8. The gauging head according to claim 2, wherein said arm defines a hole for locking the feeler to the arm.

9. A gauging head for checking linear dimensions of mechanical pieces comprising:
- an integral member including: a first section defining a measuring arm, a second section defining arm supporting means and a third section connecting the first section and the second section, the third section defining fulcrum means consisting substantially of a portion of reduced thickness permitting pivotal movements of the first section with respect to the second section, about a geometrical axis substantially perpendicular to the arm, the arm extending substantially along a longitudinal direction and having an end integrally connected with said portion and a free end;
- a feeler fixed at the free end of the arm, for contacting the piece to be checked;
- a transducer with two mutually movable elements fixed to the arm and the second section, respectively, the second section being substantially adjacent to the first section, the transducer including sealing means coupled to said mutually movable elements and providing a signal representative of the position of the arm with respect to the second section;
- a limiting device fixed to at least one of said first and second sections and adapted to cooperate with the other of said first and second sections for limiting the pivotal movements of the first section; and
- locking means for directly locking at least one of said second and third sections in at least one of two positions with respect to an external support.

10. The gauging head according to claim 9, wherein said second section includes a wing substantially perpendicular to said longitudinal direction, the wing defining holes for permitting locking of the second section and of the head to an external support.

11. The gauging head according to claim 9, further including an extension element for fixing the feeler to the free end of the arm, the extension element being fixed to the free end of the arm through screws and carrying the feeler.

12. The gauging head according to claim 9, wherein said second section has a thickness, along a direction perpendicular to said longitudinal direction, greater than the thickness of the measuring arm in the same direction perpendicular to the longitudinal direction.

13. The gauging head according to claim 9, wherein said third section defines first holes for permitting locking of the third section and of the head in said first position with respect to the external support.

14. The gauging head according to claim 13, wherein said second section and third section define further holes for permitting locking of the second and third section, and of the head, in said second position with respect to the external support.

* * * * *

UNITED STATES PATENT AND TRADEMARK OFFICE
CERTIFICATE OF CORRECTION

PATENT NO. : 4,409,737
DATED : October 18, 1983
INVENTOR(S) : Guido GOLINELLI

It is certified that error appears in the above—identified patent and that said Letters Patent is hereby corrected as shown below:

On the title page:

[56] under FOREIGN PATENT DOCUMENTS section add:

-- 2118318  7/1972  France .......... G01B 5/00 --

Signed and Sealed this

Tenth Day of January 1984

[SEAL]

*Attest:*

GERALD J. MOSSINGHOFF

*Attesting Officer*  *Commissioner of Patents and Trademarks*